US007901122B2

(12) United States Patent
Komatsu

(10) Patent No.: US 7,901,122 B2
(45) **Date of Patent: *Mar. 8, 2011**

(54) VEHICULAR LAMP UNIT

(75) Inventor: Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 525 days.

This patent is subject to a terminal disclaimer.

(21) Appl. No.: 11/938,115

(22) Filed: Nov. 9, 2007

(65) Prior Publication Data

US 2009/0027908 A1 Jan. 29, 2009

(30) Foreign Application Priority Data

Nov. 13, 2006 (JP) ................................ 2006-306462

(51) Int. Cl.
*F21V 19/02* (2006.01)
*B60Q 1/00* (2006.01)
*F21S 4/00* (2006.01)

(52) U.S. Cl. .................... 362/523; 362/507; 362/249.03; 362/545

(58) Field of Classification Search .................. 362/507, 362/523–532, 543–545, 800, 249.01–249.03
See application file for complete search history.

(56) References Cited

U.S. PATENT DOCUMENTS 7,311,423 B2 * 12/2007 Frecska et al. ................ 362/372
7,410,282 B2 * 8/2008 Eichelberger et al. ........ 362/545

FOREIGN PATENT DOCUMENTS

JP 2003-031011 A 1/2003

OTHER PUBLICATIONS

English abstract of JP2003031011 published Jan. 31, 2003, esp@cenet database, 1 page.

* cited by examiner

*Primary Examiner* — Jason Moon Han
*Assistant Examiner* — Sean P Gramling
(74) *Attorney, Agent, or Firm* — Osha • Liang LLP

(57) ABSTRACT

A lamp unit used in a vehicular lamp includes a reflector provided with a parabolic cylindrical reflective surface with a focal line in the horizontal direction; a planar light source having a light-emitting surface with a generally oblong shaped region; and a drive portion that rotatably supports the semiconductor light-emitting element portion. The generally oblong shaped region of the planar light source includes a long side in a direction parallel to the focal line and a short side of a predetermined width. The planar light source is disposed such that the light-emitting surface faces the parabolic cylindrical reflective surface of the reflector and such that a long side, on a lamp front side, generally coincides with the focal line and acts as a rotational axis.

12 Claims, 5 Drawing Sheets

VEHICULAR LAMP UNIT

BACKGROUND OF INVENTION

1. Field of the Invention The present invention relates to a vehicular lamp unit that uses a semiconductor light-emitting element such as an LED as a light source.

2. Background Art

There are an increasing number of cases in recent years where a vehicular lamp that includes a headlamp is mounted with an LED (semiconductor light-emitting element) that is compact, lightweight, and has excellent light-emitting efficiency. An LED chip used as the light source normally has a light-emitting surface with a generally oblong shape, and the LED chip is disposed such that a side end of the light-emitting surface coincides with a focal line of a reflective surface formed from a parabolic cylindrical curved surface or the like (see Patent Document 1 for an example).

Depending on driving conditions, two light distribution patterns are required of a vehicular lamp: a light distribution pattern in which diffused light is distributed in front of the vehicle and localized condensed light is weakened; and a light distribution pattern in which less diffused light is distributed in front of the vehicle and condensed light to localized portions is strengthened so that a boundary between an illuminated portion and a non-illuminated portion is clearly apparent. A particularly effective light distribution pattern during rainy weather or the like is one that reduces luminance toward the front side of the vehicle (on top of the road surface). The difference between the above two light distribution patterns is the vertical-direction spread and the intensity of condensed light in the light distribution patterns.

[Patent Document 1]

Japanese Patent Application Publication No. JP-A-2003-31011, pages 3 to 6, FIG. 1.

SUMMARY OF INVENTION

With a conventional vehicular lamp, although it may be possible to realize the above two light distribution patterns using a unit that combines a plurality of headlamps, it is impossible to modify the light distribution pattern using one headlamp. Hence, one or more embodiments of the present invention modify a vertical-direction spread and an intensity of condensed light in a light distribution pattern using one lamp.

A lamp unit according to one or more embodiments of the present invention is a lamp unit used in a vehicular lamp, and includes a reflector provided with a parabolic cylindrical reflective surface with a focal line in the horizontal direction; a planar light source having a light-emitting surface with a generally oblong shaped region, which includes a long side in a direction parallel to the focal line and a short side of a predetermined width; and light source driving means for rotatably supporting the planar light source, which is disposed such that the light-emitting surface faces the parabolic cylindrical reflective surface of the reflector and such that the long side on the lamp front side generally coincides with the focal line, with the long side acting as a rotational axis. According to such a configuration, rotating the oblong shaped light-emitting surface changes the region of the light-emitting surface facing the reflector in the vertical direction of the light distribution pattern. Therefore, it is possible to modify the vertical-direction spread of the light distribution pattern of light reflected from the reflector. In addition, the intensity of condensed light can be strengthened or weakened by shrinking or expanding the light distribution pattern in the vertical direction.

According to one or more embodiments of the present invention, the light source driving means is rotatable from a position where the light-emitting surface of the planar light source is disposed such that a normal line of the light-emitting surface is vertical to a position where the normal line of the light-emitting surface is inclined only a predetermined angle toward the front of the lamp. Furthermore, the light source driving means can rotate the light-emitting surface within a range of arbitrarily set rotational angles. According to such a configuration, it is possible to arbitrarily modify the vertical-direction spread and the intensity of condensed light in the light distribution pattern, as well as fix a predetermined light distribution pattern. In addition, the planar light source in the present invention is preferably structured from a semiconductor light-emitting element having an arrayed configuration.

Other aspects and advantages of the invention will be apparent from the following description and the appended claims.

DETAILED DESCRIPTION

Figure 1:
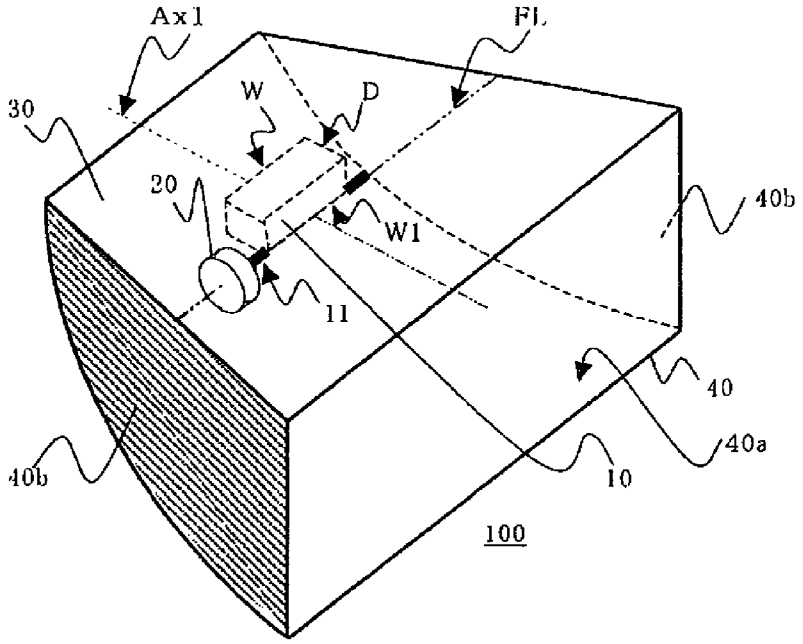
FIG. 1 is a drawing showing the structure of a vehicular lamp unit according to one or more embodiments of the present invention.

FIG. 1 is a drawing showing the structure of a vehicular lamp unit according to one or more embodiments of the present invention. A vehicular lamp unit 100 is mainly provided with a semiconductor light-emitting element portion 10, a drive portion 20, a support bracket 30 that fixes the drive portion 20 and also functions as a light control member, and a reflector 40 that has a parabolic cylindrical shape and is disposed downward of the support bracket 30.

The reflector 40 has a reflective surface 40*a* that is formed from a parabolic cylindrical curved surface with a focal line FL extending in the horizontal direction. Both sides of the reflective surface 40*a* are formed with a pair of side surface walls 40*b*. In such a case, the focal line FL is set so as to extend in a direction perpendicular to a unit central axis Ax1 of the lamp unit 100. The unit central axis Ax1 is a parabolic axis that forms a vertical cross section of the parabolic cylindrical surface. The pair of side surface walls 40*b* has a symmetrical shape in relation to the unit central axis Ax1 and each is formed as a vertical wall that expands forward.

Figure 2:
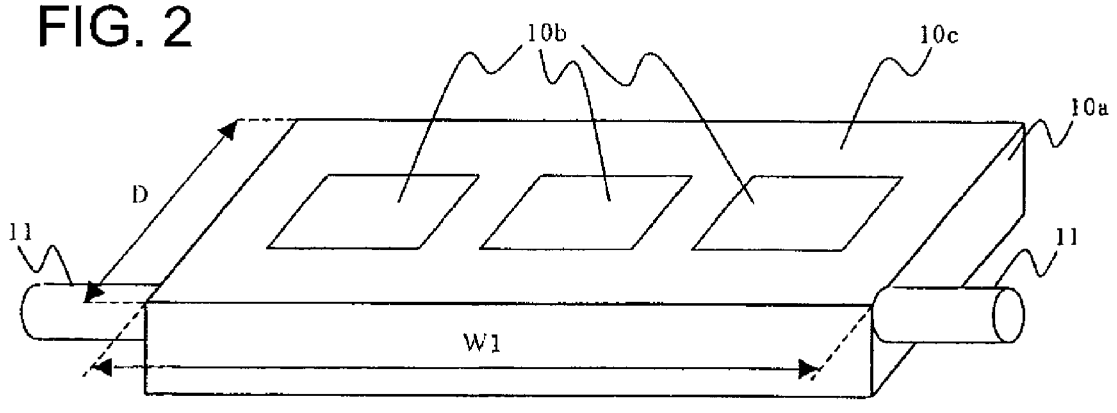
FIG. 2 is a drawing showing the detailed structure of a semiconductor light-emitting element portion of the vehicular lamp unit according to one or more embodiments of the present invention.

As FIG. 1 shows, the semiconductor light-emitting element portion 10 is a light source that has a light-emitting surface 10*c* with a generally oblong shaped region, which includes a long side W in a direction parallel to the focal line FL of the parabolic cylindrical reflector 40 and a short side D of a predetermined width (see FIG. 2). The drive portion 20 rotatably supports the light source (the semiconductor light-emitting element portion 10), which is disposed such that the light-emitting surface 10*c* faces the parabolic cylindrical reflective surface 40*a* of the reflector 40 and such that a long side W1 on the lamp front side generally coincides with the focal line FL, with the long side W1 acting as a rotational axis.

FIG. 2 is a drawing showing the structure of the semiconductor light-emitting element portion of the vehicular lamp according to one or more embodiments of the present invention. The semiconductor light-emitting element portion 10 is formed so as to structure a light-emitting surface, wherein a plurality of white light-emitting diodes 10*b* with light-emitting chips such as LEDs are disposed on a substrate 10*a*. An end of a rotational axis 11, which is provided on both ends of the long side W1, is held by the rotational axis of the drive portion 20 such that the long side W1 of the oblong shaped light-emitting surface 10*c* coincides with the focal line FL, as described above. The semiconductor light-emitting element portion 10 is designed to be rotatable from a position where the light-emitting surface 10*c* is disposed facing vertically downward (i.e., facing a direction where the normal line of the light-emitting surface is vertical) to a position where the normal line of the light-emitting surface is inclined only a predetermined angle toward the front of the lamp. Details regarding the rotational range of the light-emitting surface 10*c* will be set forth later. The drive portion 20 is structured from drive parts including a motor, and is fixed on the support bracket 30. The rotational force of the drive portion 20 is transmitted so as to rotate and set the position of the light-emitting surface 10*c* of the semiconductor light-emitting element portion 10 at a predetermined angle.

Figures 3A, 3B:
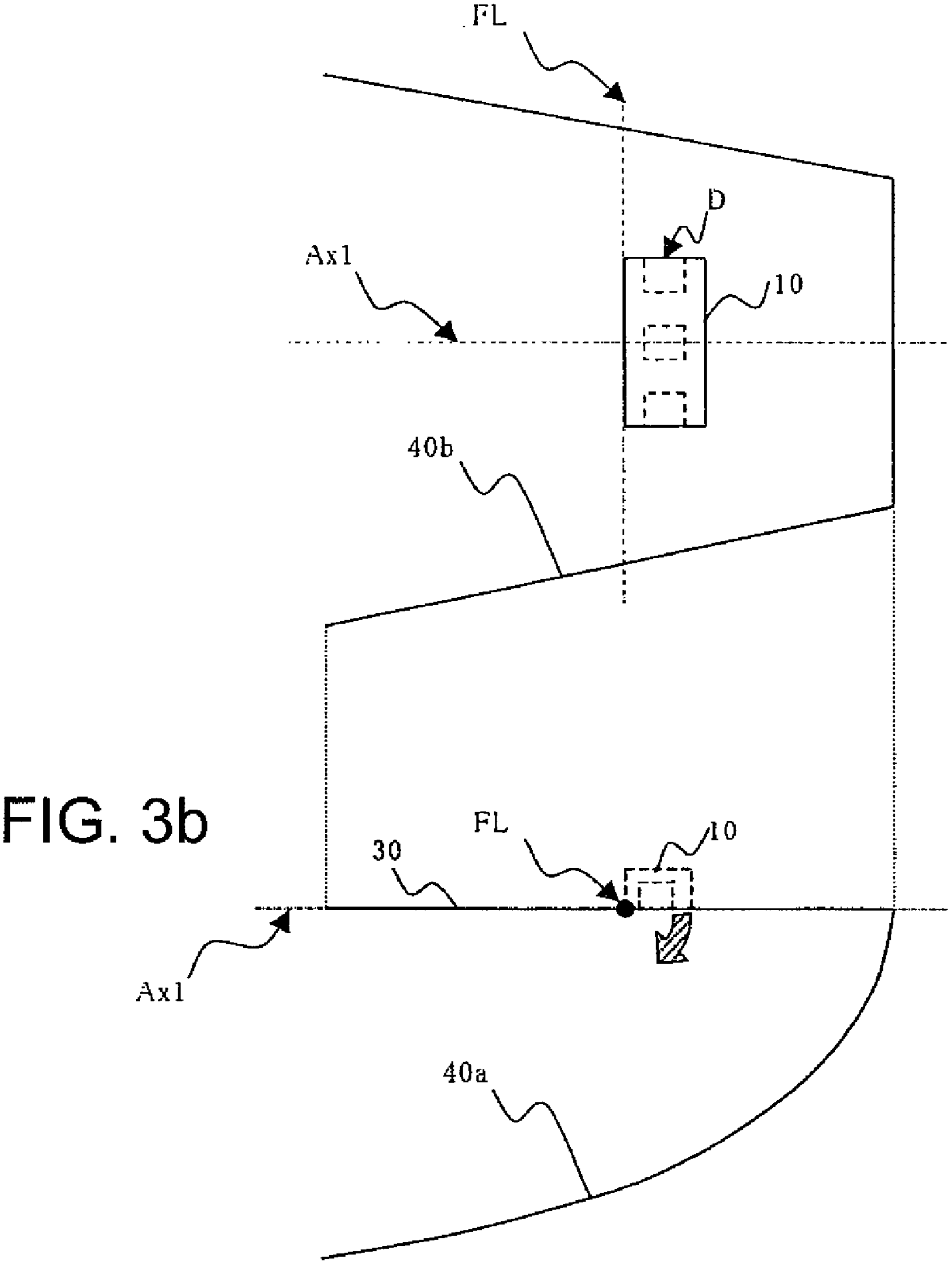
FIG. 3 shows explanatory drawings of how the semiconductor light-emitting element portion is rotated by a drive portion (to a first position) in the vehicular lamp unit according to one or more embodiments of the present invention.
Figures 4A, 4B:
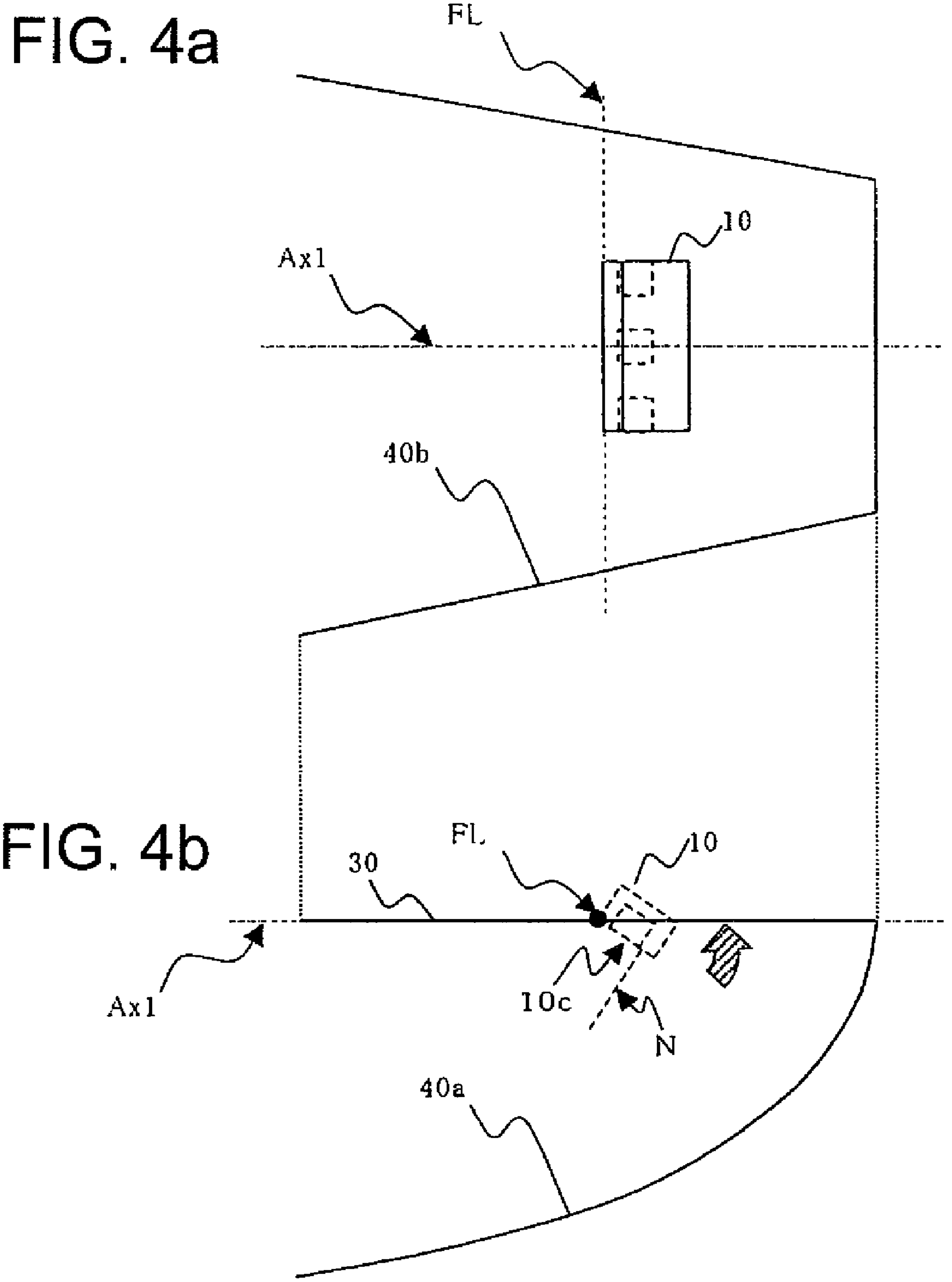
FIG. 4 shows explanatory drawings of how the semiconductor light-emitting element portion is rotated by the drive portion (to a second position) in the vehicular lamp unit according to one or more embodiments of the present invention.

FIGS. 3 and 4 are explanatory drawings of how the semiconductor light-emitting element portion is rotated by the drive portion in the vehicular lamp unit according to one or more embodiments of the present invention. It should be noted that the drive portion 20 is omitted from the figures for convenience. Normally, as shown by a top view in FIG. 3(*a*) and a vertical cross-sectional view in FIG. 3(*b*), the semiconductor light-emitting element portion 10 is disposed at a position where the long side W1 thereof coincides with the focal line FL, and the light-emitting surface extends for the width D from the proximity of an intersection between the unit central axis Ax1 and the focal line FL to the rear of the lamp. The arrangement of the semiconductor light-emitting element portion 10 as described above will be referred to as a "first position" below.

Meanwhile, as shown in the vertical cross-sectional view of FIG. 4(*b*), by rotating the semiconductor light-emitting element portion 10 approximately 30° clockwise through rotation of the drive portion 20, the long side W1 of the semiconductor light-emitting element portion 10 coincides with the focal line FL, while the light-emitting surface moves toward a position at which a normal line N of the light-emitting surface 10*c* inclines toward the front of the lamp. In other words, because the light-emitting surface inclines toward the front of the lamp, more light directly reaches the front of the lamp. The arrangement of the semiconductor light-emitting element portion 10 as described above will be referred to as a "second position" below. Using the first position as a reference, the second position is a 30° position when represented as a rotational angle measured from the reference position.

Figure 5:
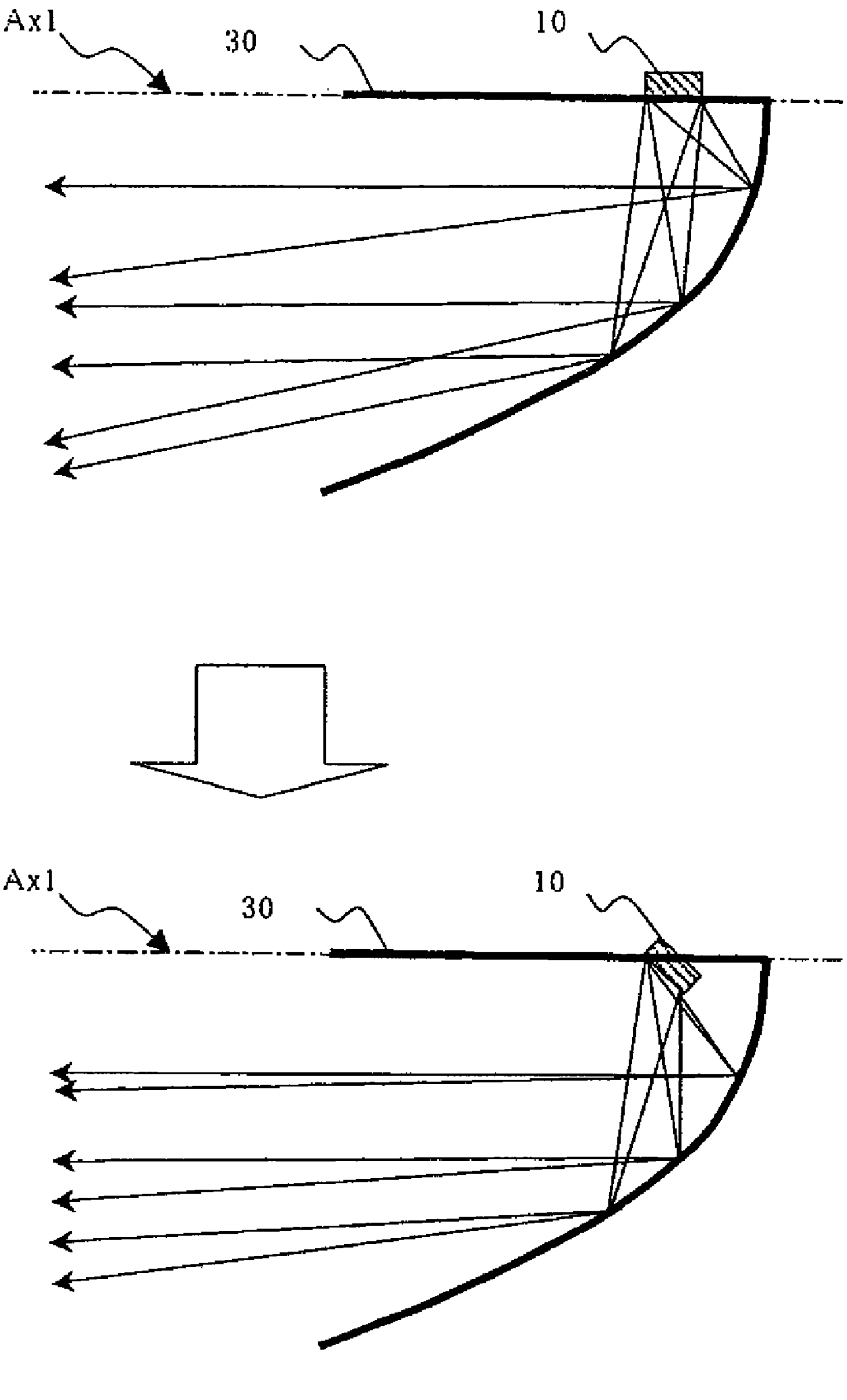
FIG. 5 shows explanatory drawings of a change in the light path due to rotation of the semiconductor light-emitting element portion.

FIG. 5 shows schematic diagrams for explaining a change in the light path due to rotation of the semiconductor light-emitting element portion. As FIG. 5 shows, when lit at the first position, light moves straight toward the front of the lamp, parallel to the unit central axis Ax1, and there is also a light path advancing downward and forward near the lamp (toward the top of the road surface). Therefore, a relatively wide range can be illuminated. On the other hand, when lit at the second position, a configuration can be achieved in which less light advances toward the top of the road surface, and condensed light is distributed in a relatively narrow range toward the front of the lamp.

Figure 6:
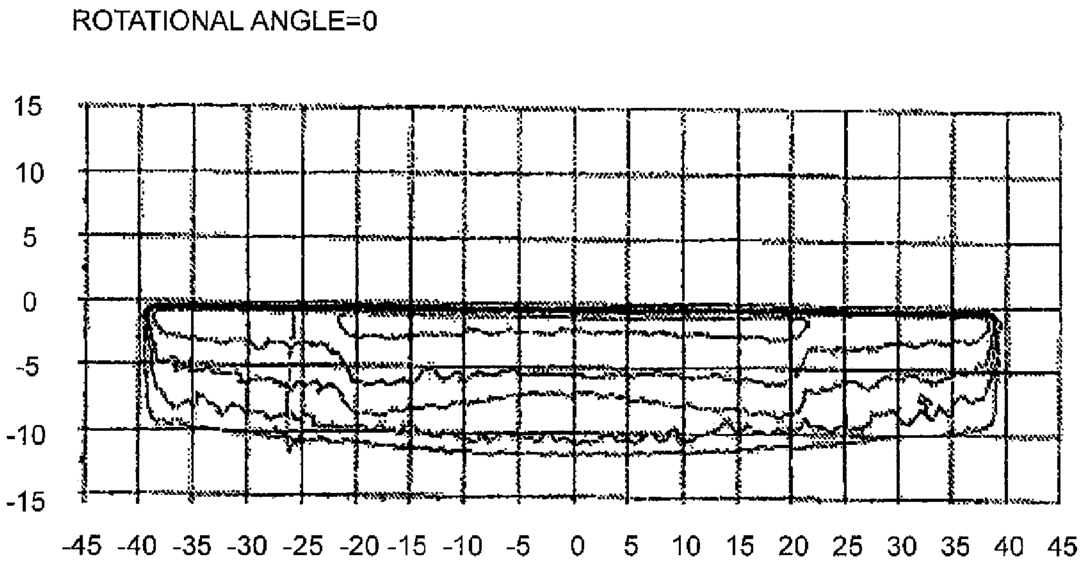
FIG. 6 is a drawing showing a light distribution pattern at the first position in the vehicular lamp unit according to one or more embodiments of the present invention.

FIG. 6 is a schematic diagram showing a light distribution pattern at the first position (at a 0° rotational angle) in the vehicular lamp unit according to one or more embodiments of the present invention. As FIG. 6 shows, diffused light is radiated toward the front of the vehicle and the intensity of condensed light is relatively weak.

Figure 7:
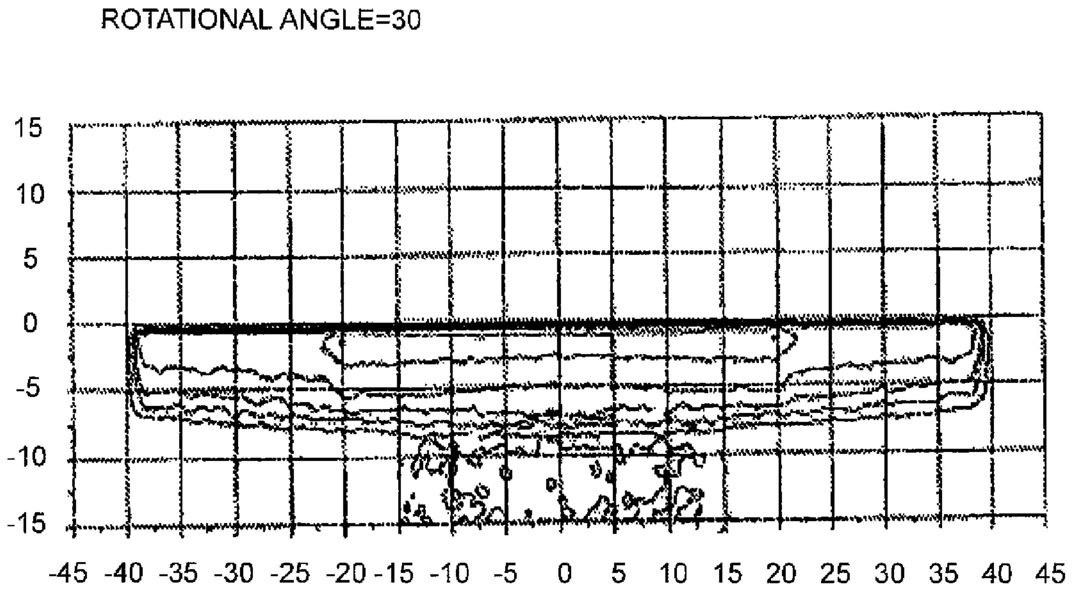
FIG. 7 is a drawing showing a light distribution pattern at the second position in the vehicular lamp unit according to one or more embodiments of the present invention.

FIG. 7 is a schematic diagram showing a light distribution pattern at the second position (at a 30° rotational angle) in the vehicular lamp unit according to one or more embodiments of the present invention. As FIG. 7 shows, when lit at the second position, more light moves straight toward the front of the lamp, parallel to the unit central axis Ax1, and it is possible to irradiate a relatively narrow range in a condensed manner. Therefore, it is possible to effectively reduce the reflective glare from the road surface for an oncoming vehicle during rainy weather, because the source of such light is diffused light radiated toward the top of the road surface.

The rotational angle set by the drive portion 20 is not particularly limited to an angle of 0° or 30°, and an arbitrary angle from 0° to 30° (or an angle over 30°) may be set. In such case (for example, during rotation from 0° to 30°), the light distribution pattern is assumed to gradually change.

During rotation, there is no sudden change in illumination condition that cannot be followed by the eyes of the driver of the vehicle, so there is no risk of creating an unsafe condition by rotating the semiconductor light-emitting element portion while driving. Thus, the driver may operate the drive portion 20 while driving to select a light distribution pattern at an arbitrary rotational angle depending on external weather, driving, or other conditions. In addition, the rotational angle may be automatically set after judging various conditions such as external brightness.

The drive portion 20 was described as being structured from drive parts including a motor in the above embodiments. However, embodiments of the present invention are not particularly limited to such a drive portion structured from such drive parts. Any type of mechanism may be employed, provided that an actuator, or the like, enables rotation of the semiconductor light-emitting element portion 10.

According to the vehicular lamp unit of one or more embodiments of the present invention, it is possible to arbitrarily modify the light distribution pattern using one lamp, without disposing a plurality of lamps with different light distribution patterns in the vehicular lamp unit. By modifying the vertical-direction spread and the intensity of condensed light in the light distribution pattern, the reflective glare from the road surface for an oncoming vehicle, particularly during rainy weather, can be effectively reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS

10 Semiconductor Light-Emitting Element Portion
10*a* Substrate
10*b* White Light-Emitting Diode
10*c* Light-Emitting Surface
20 Drive Portion
20*a* Rotational Axis
30 Support Bracket
40 Reflector
40*a* Reflective Surface
40*b* Side Surface Wall
100 Lamp Unit
Ax1 Unit Central Axis
Fl Focal Line
W Long Side Of Generally Oblong Shaped Reflective Surface Of Semiconductor Light-Emitting Element Portion
W1 Long Side Of Generally Oblong Shaped Reflective Surface Of Semiconductor Light-Emitting Element Portion (Lamp Front Side)
D Short Side Of Generally Oblong Shaped Reflective Surface Of Semiconductor Light-Emitting Element Portion
N Normal Line Of Generally Oblong Shaped Reflective Surface Of Semiconductor Light-Emitting Element Portion

What is claimed is:

1. A lamp unit used in a vehicular lamp, the lamp unit comprising:

- a reflector comprising a parabolic cylindrical reflective surface with a focal line in a horizontal direction;
- a planar light source comprising a light-emitting surface with a generally oblong shaped region; and
- light source driving means for rotatably supporting the planar light source,
- wherein the generally oblong shaped region of the planar light source comprises a long side in a direction parallel to the focal line and a short side of a predetermined width,
- wherein the planar light source is disposed
  - such that the light-emitting surface faces the parabolic cylindrical reflective surface of the reflector and
  - such that the long side, on a lamp front side, generally coincides with the focal line and acts as a rotational axis, wherein the planar light source is rotatable about the rotational axis from a first position to a second position, the lamp unit has an optical axis perpendicular to the rotational axis, in the first position, light emitted by the planar light source is reflected by the reflector such that some of the reflected light is parallel to the optical axis, and some of the reflected light is directed at a first angle downwards from the optical axis, and in the second position, light emitted by the planar light source is reflected by the reflector such that some of the reflected light is parallel to the optical axis, and some of the reflected light is directed at a second angle downwards from the optical axis, and wherein the second angle is smaller than the first angle.

2. The lamp unit according to claim 1, wherein the light source driving means is rotatable from a position where the light-emitting surface of the planar light source is disposed such that a normal line of the light-emitting surface is vertical to a position where the normal line of the light-emitting surface is inclined by a predetermined angle toward a front of the lamp.

3. The lamp unit according to claim 1, wherein the light source driving means rotates the light-emitting surface within a range of arbitrarily set rotational angles.

4. The lamp unit according to claim 1, wherein the planar light source comprises a semiconductor light-emitting element having an arrayed configuration.

5. The lamp unit according to claim 2, wherein the light source driving means rotates the light-emitting surface within a range of arbitrarily set rotational angles.

6. The lamp unit according to claim 2, wherein the planar light source comprises a semiconductor light-emitting element having an arrayed configuration.

7. The lamp unit according to claim 3, wherein the planar light source comprises a semiconductor light-emitting element having an arrayed configuration.

8. A lamp unit used in a vehicular lamp comprising:

- a reflector comprising a parabolic cylindrical reflective surface with a focal line in a horizontal direction;
- a planar light source comprising a light-emitting surface with a generally oblong shaped region; and
- a drive portion rotatably supporting the planar light source,
- wherein the generally oblong shaped region of the planar light source comprises a long side in a direction parallel to the focal line and a short side of a predetermined width, and
- wherein the planar light source is disposed
  - such that the light-emitting surface faces the parabolic cylindrical reflective surface of the reflector and
  - such that the long side, on a lamp front side, generally coincides with the focal line and acts as a rotational axis, wherein the planar light source is rotatable about the rotational axis from a first position to a second position, the lamp unit has an optical axis perpendicular to the rotational axis, in the first position, light emitted by the planar light source is reflected by the reflector such that some of the reflected light is parallel to the optical axis, and some of the reflected light is directed at a first angle downwards from the optical axis, and in the second position, light emitted by the planar light source is reflected by the reflector such that some of the reflected light is parallel to the optical axis, and some of the reflected light is directed at a second angle downwards from the optical axis, and wherein the second angle is smaller than the first angle.

9. The lamp unit according to claim 8, wherein the drive portion is rotatable from a position where the light-emitting surface of the planar light source is disposed such that a normal line of the light-emitting surface is vertical to a position where the normal line of the light-emitting surface is inclined by a predetermined angle toward a front of the lamp.

10. The lamp unit according to claim 8, wherein the light source drive portion rotates the light-emitting surface within a range of arbitrarily set rotational angles.

11. The lamp unit according to claim 8, wherein the planar light source comprises a semiconductor light-emitting element having an arrayed configuration.

12. The lamp unit according to claim 8, wherein the drive portion comprises a motor.

* * * * *